350-6.5 SR
XR 2,976,361
REFERENCE SEARCH ROOM

March 21, 1961 G. M. STAMPS 2,976,361

CONTINUOUS SCANNER WITH WARPED MIRROR

Filed April 12, 1956 2 Sheets-Sheet 1

INVENTOR.
GEORGE M. STAMPS
BY J. B. Burke
ATTORNEY

2976361
NO OR CLASSIF

March 21, 1961 G. M. STAMPS 2,976,361

CONTINUOUS SCANNER WITH WARPED MIRROR

Filed April 12, 1956 2 Sheets-Sheet 2

INVENTOR.
GEORGE M. STAMPS
BY J. B. Burke
ATTORNEY

United States Patent Office 2,976,361

Patented Mar. 21, 1961

2,976,361

CONTINUOUS SCANNER WITH WARPED MIRROR

George M. Stamps, New Hyde Park, N.Y., assignor to Faximile Inc., New York, N.Y., a corporation of Delaware Filed Apr. 12, 1956, Ser. No. 577,708

6 Claims. (Cl. 178—7.6)

This invention relates to the art of facsimile communications and particularly concerns novel scanning apparatus useful in such systems.

Mechanical scanning devices as heretofore known for use in high quality, facsimile communications art have generally employed rotating members which are rather difficult and expensive to manufacture. The mechanical arrangements for rotating the members are rather complex to insure vibration-free rotation. This further adds to the cost of the scanning device. The present invention is directed at providing a continuous copy scanning device which is considerably simpler in construction and less expensive to manufacture, while the scanning is accomplished with fidelity equal or superior to that which has hitherto been attainable in a facsimile transmitter or recorder.

In my copending application entitled "Continuous Scanner" filed simultaneously with this application, I disclose a scanning system employing a ring-like refractive prism as a line sweep generating element. In the present application I disclose a scanning system employing a warped mirror as a sweep generator element.

It is therefore a principal object of the invention to provide a facsimile apparatus useful in graphic copy transmission or recording, and employing a warped mirror as a scanner element to generate a line scanning sweep.

It is a further object to provide a warped mirror for generating a line scanning sweep in a facsimile system.

It is a further object to provide a rotatable drum or disk having a warped mirror thereon for repeatedly scanning successive lines on a copy sheet.

It is a further object to provide a device including a disk having a spiral slit therein and carrying a warped or twisted mirror for continuously scanning a line on a copy sheet.

It is a further object to provide a device of the character described with a refractive element having a spiral groove to serve as a light collector and light director.

Other and further objects and advantages of the invention will become apparent from the following description taken together with the drawing, wherein.

Figure 4:
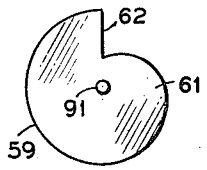
Figs. 4 and 5 are plan views of end plates of the disk.
Figure 6:
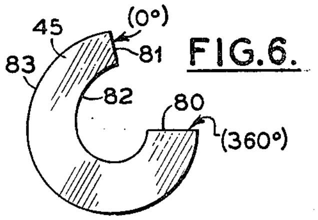
Fig. 6 is a view of the mirror developed on a flat plane.
Figure 5:
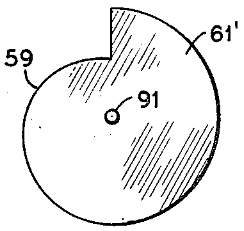
Figure 1:
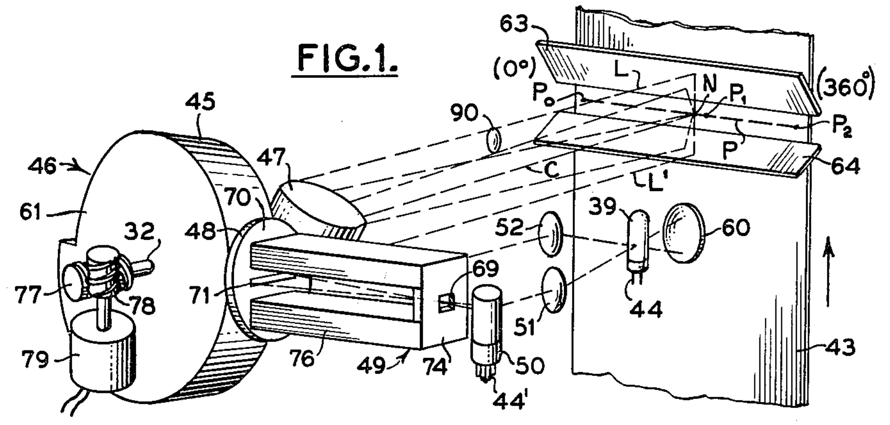
Fig. 1 is a perspective view of a facsimile scanning apparatus employing the scanner disk with warped mirror on the perimeter thereof.

In Fig. 1 is shown a facsimile apparatus in which a line P on a copy sheet 43 is scanned and the image of the line is optically transmitted via a bent optical path to a photocell 50. The apparatus includes warped cylindrical disk 46 having on its perimeter a warped or twisted mirror 45 as the line sweep generating element. The disk and mirror structure are best shown in Figs. 2–6. Disk 46 has a smaller flat face plate 61 whose shape is similar to that shown in Figs. 3 and 4. The disk has a larger face plate 61′ whose shape is shown in Fig. 5. The curved portions of the perimeters of the face plates 61 and 61′ define substantially logarithmic spirals. These plates are disposed parallel to each other. All planes through the axis of the disk parallel to faces 61 and 61′ have spiral perimeters except mid-way between the ends of the axis where the cross section plane is circular. The mirror 45 is generally C-shaped as shown in Fig. 6 when developed on a flat plane. It has a wider straight end 80 and a narrow straight end 81. Sides 82 and 83 are both spiral with side 83 having a greater radius. The longer curved side 83 is placed in registry with the curved rim 59 of face plate 61′ and the smaller curved side is juxtaposed with the curved rim 59 of face plate 61. When the mirror is mounted on the plates 61, 61′ its smaller and larger edges define substantially logarithmic spirals. The center of the wider straight edge 80 intersects the center of the narrower straight edge 81 at an acute angle. The surface of the mirror 45 varies smoothly in inclination with respect to sides 61 and 61′ and to the axis of the disk. The inclination is maximum at end 81 which may represent the 0° of the mirror. The inclination minimum is at end 80 which may represent the 360° on the mirror. The surface of the mirror may be regarded as being the locus of a line whose center is carried in a circle around an axis with the ends of the line moving in plane parallel spiral paths of different radii so that the inclination of the line varies smoothly. At the transition point from 360° to 0° a discontinuity exists as the inclination changes abruptly from one extreme of inclination to another. At an intermediate point such as the 180° point the inclination will be intermediate the inclinations at 0° and 360°. The central line shown by dotted line 95 in Fig. 3 of the mirror is a circle, and both spiral edges 82 and 83 lie in the flat parallel planes defined by the perimeters of the plates 61, 61′. Apertures 91 are provided in both plates for securing the shaft 32 thereto. The mirror may be a light reflecting warped or twisted flexible band secured on the periphery of disk 46. Instead of forming disk 46 as a hollow member with end plates 61, 61′ the disk 46 may be a solid member having its periphery suitably shaped with the surface 45 rendered reflecting by metallizing or other conventional means.

Figure 8:
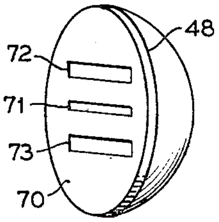
Fig. 8 is a perspective view of a masked lens used in the apparatus of Fig. 1.
Figure 7:
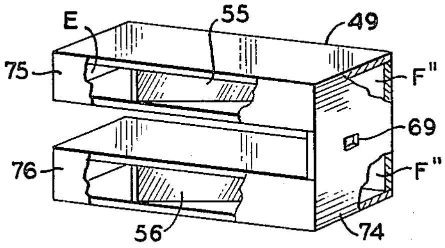
Fig. 7 is a perspective view of a light baffle or light shield box used in the apparatus of Fig. 1.

In Fig. 1, copy 43 is illuminated by a projected spot of light on the elemental scan area N. The light originates at lamp 39 provided with a reflector 60 and energizes via wires 44. A divided optical path is provided from lamp 39 to the scanned spot N. In this optical path are projection lenses 51, 52 and a light shield box 49. This box is best shown in Fig. 7. The box has a pair of obliquely disposed mirrors 55, 56. Two shielded light paths are provided by the rectangular sections 75, 76 of the light box. The ends E of the sections are open. The mirrors 55, 56 face open sides of the sections 75, 76. A lens 48 is disposed at the ends E of box 49. This lens as best shown in Fig. 8 has an opaque mask 70 in which are three slits or windows 71, 72, and 73. The upper and lower slits 71, 73 of lens 48 are exposed to ends E of the shielded sections 75, 76. Mirror 45 is disposed between lens 48 and a cylindrical objective lens 47 as shown best in Fig. 9. The optical path from lens 47 to lens 48 is bent at an angle which varies as the mirror 45 is rotated. The mirror 45 is mounted on disk 46 which is rotated on shaft 32 by motor 79 via gears 77, 78. A pair of obliquely placed mirrors 63, 64 are disposed to reflect separate light beams L and L′ to the scanned spot N. The optical path for light from lamp 39 to the spot N on the copy sheet thus is divided into two portions. One portion of the path include lens 52, mirror 55, slit 72, lens 48, mirror 45, lens 47 and mirror 63. The other portion of the path includes lens 51, mirror 56, slit 73, lens 48, mirror 45, lens 47 and mirror 64. A reflector 60 is provided for lamp 39. The lamp is energized via wires 44 connected to the lamp socket.

The optical path for light reflected from spot N to phototube 50 includes lens 47, mirror 45, lens 48, slit 71, and aperture 69. Aperture 69 is an opening in the end place 74 of box 49 and is located at the focus of lens 48. Aperture 69 is focused on spot N on line P and the image of N is focused at aperture 69.

Figure 9:
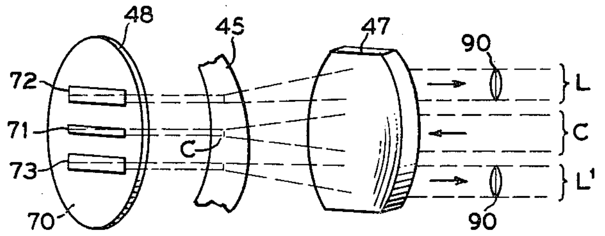
Fig. 9 shows diagrammatically a portion of the optical path and optical elements therein of the apparatus of Fig. 1.

In Fig. 9 is shown schematically a portion of the reentrant optical path including parallel beams L′ and L leaving lens 47 and the centrally disposed beam C traveling in the opposite direction through lens 47 and mirror surface 45 to lens 48. Lens 90 is shown disposed in the path of beams L′ or L. The lens 47 corrects for vertical plane divergence of the beams. Lens 47 may if desired be formed by two separate lenses, a cylindrical lens and an objective lens.

Light beam C from the scanned spot N, actually is a diffuse reflection from the copy sheet 43, which travels a reentrant optical path between beams L′ and L and through lens 47 to the mirror surface 45. From the mirror surface the light beam is reflected through a central portion of lens 48 and slit 71 and is focused on aperture 69. The light traveling to aperture 69 is shielded from the light beams traveling in the opposite direction by the baffle arrangement of the light shield box 49. The light passing aperture 69 reaches the phototube or photocell 50. This tube may be a photomultiplier type tube.

The light beams L and L′ follow a divided optical path and they are reflected from differently inclined portions of the mirror surface so that they may leave the mirror in slightly different directions. In order to insure that the two light beams leave the mirror in parallel directions the positions of lenses 51 and 52 may be adjusted relative to each other. The light beams leaving the mirror surface 45 pass objective lens 47 which may have a cylindrical curvature to further correct for any divergence in the parallel beams L′ and L. The beams L′ and L fall on the tilted mirrors 63 and 64 above and below the scan line P. From these mirrors the light is reflected to copy 43. This angular projection of the light beams on the scan line is provided to prevent specular reflection (glare) back along the optical path to the phototube.

In operation of the apparatus, as mirror 45 is rotated the illuminated spot area N moves between the extreme points $P_0$ and $P_2$ on the scanned line P. At the same times the image of aperture 69 moves with area N. Thus the line P is simultaneously scanned by an intense beam of light and an image of photocell 50 which is adjacent aperture 69.

When the scanned area is at $P_0$, the light beams L and L′ are being reflected from a region of maximum inclination of mirror 45 with respect to sides 61, 61′ near the 0° point or end 81. When the scanned area is at $P_2$ the light beam is being reflected from the region near the 360° or end 80. When the scanned area is at $P_1$ the light beam C is being reflected to the 180° point on the mirror while beams L and L′ are being reflected from points substantially equidistant to and lying on opposite sides of the 180° on the mirror. By using a split or divided path for light directed from lamp 39 to copy each path more illumination of the scanned line P is obtained.

In the system of Fig. 1 the elemental scanned area N will move at a constant rate if the mirror is rotated at a constant rate. This scanning system thus produces an exactly repetitive scan without scanning spot vibration or "jitter."

If it is found that the movement of the projected light spot does not track exactly with the movement of the scanned spot N on the scan line, a lens 90 may be provided in either optical path of beam L′ or L. This lens should have a slight positive power to correct the motion of the beam so that exact tracking of the light spot is obtained.

The only moving parts in the system of Fig. 1 are the rotating disk 46 and the copy sheet 43. The copy sheet may be moved by its own feed mechanism or may be driven by suitable gearing by the motor 79. By changing the focal length of lens 48 any desired width of copy may be scanned. It should be noted that the image of the scanned spot N cast on the tube 50 does not move. Thus a photocell or phototube with a sensitive surface of very limited area may be used. Phototube 50 may be of a known type such as a photomultiplier tube. The modulated light signals applied thereto are converted to electrical pulses for transmission to a remote point as well known in the art. Since lamp 39 emits a constant amplitude of light, which intensely illuminates a moving scanning area N of the apparatus of Fig. 1 serves as a spot illumination scanner.

The projection lamp 39 may be a small tungsten lamp since the concentrated light spot projected on copy 43 moves with the scan spot N making flood illumination of the entire scanned line P unnecessary. Since the scan spot N is illuminated by an intense light spot any normal ambient light of lesser intensity cannot introduce difficulties in the scanning procedure.

A particular features of the invention to be emphasized is the generation of the scan of line S solely by rotation of mirror 45. The line is scanned simultaneously both by the moving light spot and the moving focal point of lens 47 on the scanned spot N. The bent and reversed optical paths minimize the overall dimensions of the apparatus. By masking lens 48 three separate optical paths for light reflected by mirror 45 are defined, which minimize the number of lenses in the system. The overall objective of this apparatus of obtaining economy, simplicity, and ruggedness of construction with an improvement in fidelity of scanning is thus achieved.

Figure 10:
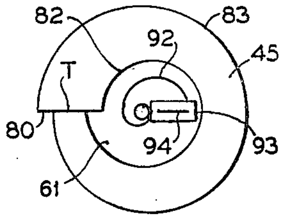
Fig. 10 shows a scanning device including a disk having a spiral slit centrally disposed therein.
Figure 3:
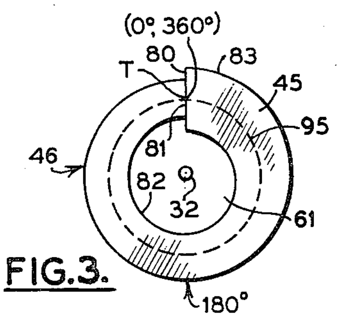

Fig. 10 shows an optical scanning assembly employed in a modification of the invention. This assembly includes a spiral slit 92 in the opaque plate or disk 61. An opaque plate 93 is disposed near the disk 61 and has a linear slit 94. This arrangement of a spiral slit in association with a linear slit for a facsimile scanner is disclosed in my copending application 291,144 filed June 2, 1952. To the disk 61 is attached the mirror 45 as disclosed herein.

Figure 11:
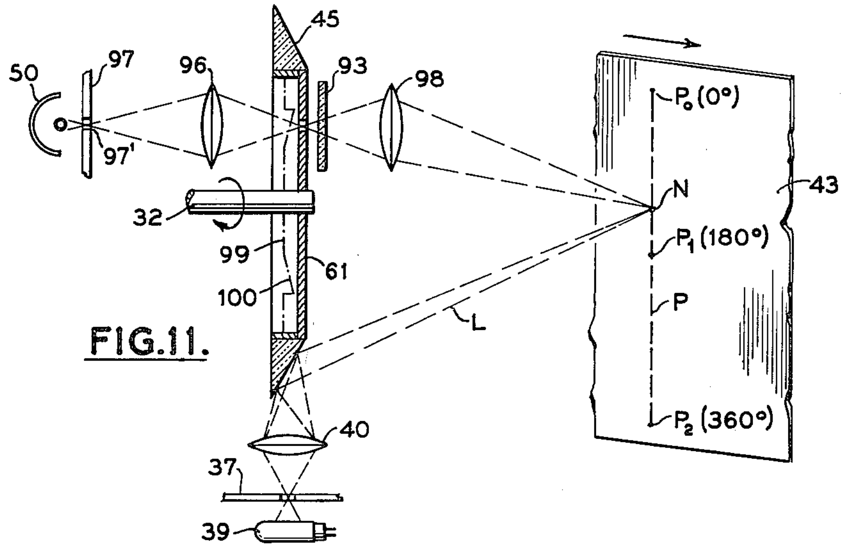
Fig. 11 is a diagram of a copy scanning apparatus embodying the device of Fig. 10.

In Fig. 11 is shown a scanning system employing the assembly of Fig. 10. Lamp 39 projects a light beam through the aperture in plate 37, lens 40, to mirror 45. As the disk and mirror rotate on shaft 32, the scan line P is illuminated by a moving spot of light at the scan area N. From the moving area N the reflected light is transmitted through lens 98, the intersecting linear slit 93 and spiral slit 92, lens 96, and aperture 97′ in plate 97 to the photocell 50. The rotating spiral slit and intersecting stationary slit 94 define a moving aperture which scans line P simultaneously with the illumination thereof by the light beam reflected by mirror 45. The copy 43 may be moved in a path disposed angularly with respect to the disk 61 to avoid specular reflection thereon.

In my copending application 419,747, filed March 30, 1954, I disclosed an improved scanning element which may be a round disk of transparent material. The disk has an opaque film layer attached to one side thereof. In the film is a spiral window or slit. This slit may be a spiral of dots, or the transparency of the slit may vary sinusoidally. In registration with the spiral is a groove which is cut or formed in the free side of the disk. The angle of inclination of the bottom of the groove varies continuously. It was disclosed that this scanning member may serve simultaneously as light director, light chopper, and line scanner. If the outer edge of such a disk is formed as a warped mirror such as disclosed herein, the resulting scanning element may be used in an optical system such as that of Fig. 11 to embody in one element the characteristics of a light refractor, light director, light chopper and line scanner. The dotted line 99 in Fig. 11 represents schematically the addition to disk 61 of such a transparent disk with the spiral groove 100 therein. The spiral slit 92 is disposed in registration with the center of the inclined bottom of the groove. When such a light director is used, the condenser lens 96 may be omitted from the system of Fig. 11.

Figure 12:
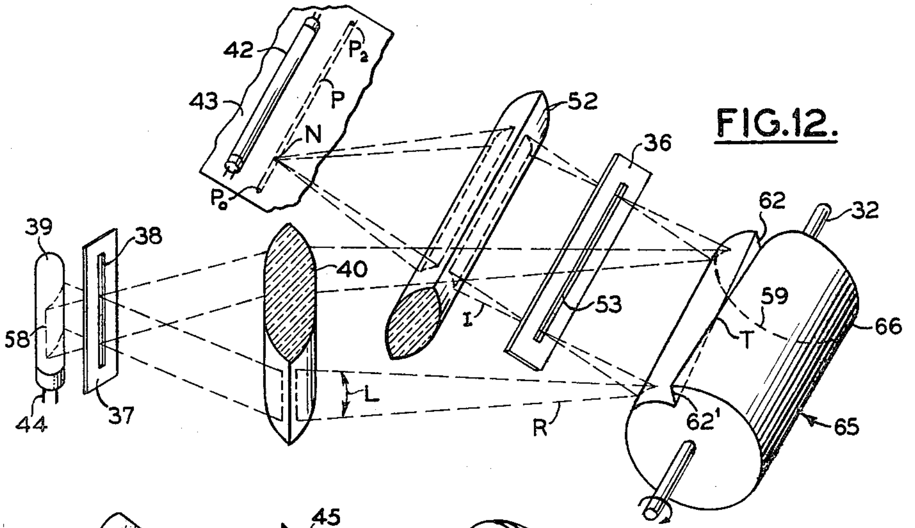
Fig. 12 is a perspective view of a scanning device, employing a scanning drum with a warped mirror thereon.
Figure 13:
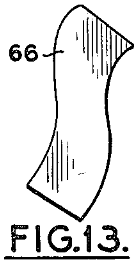
Fig. 13 is a view of the mirror shown in Fig. 12, with with the mirror developed on a flat plane.
Figure 2:
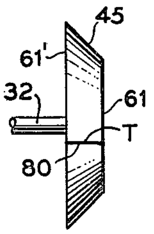
Figs. 2 and 3 are side elevational and plan views respectively of a scanner disk having a warped mirror on the perimeter thereof.

A scanning device employing a reflection scanning element mounted on a warped cylindrical drum is shown in Fig. 12. Drum 65 includes a twisted or warped light reflector or mirror surface 66. This surface slopes with respect to the shaft 32. The slope varies continuously around the drum. In Fig. 13 is shown the general S-shape of the mirror 66 when developed in a flat plane. Fig. 4 shows the substantially logarithmic spiral form of both the upper and lower end plates or faces 61 of the drum. These ends are equal in size. The upper end plate 61 is arranged so that the straight radial portion 62 is aligned above the corresponding straight radial portion 62 of the lower end plate 61. The spiral portions 59 of the perimeters of both ends are curved or oriented in opposite directions. The planes of all cross sections of the drum perpendicular to axial shaft 32 and parallel to end faces 61 have spiral perimeters except the plane midway between the faces which is circular. Mirror 66 may be a stainless steel band, a mirrorized transparent plastic strip or other suitable reflector secured to the edges of the perimeters 59, 62 of the ends 61, 61'.

Phototube 50 is located at the end of an optical path including the mirror 66 vertical cylindrical lens 40, horizontal cylindrical lens 52 and the plates 36, 37 which have slits 38 and 53 therein respectively. A tubular fluorescent lamp 42 is used to illuminate the copy 43 on which lies the scanned line P. A horizontal cylinder lens 52 forms a horizontal line image of the elemental scan area N on slit 53 in the opaque plate 36. The optical path through the plate 36 is thus slit-like with the smaller dimension of slit 53 disposed in the vertical paper feed direction and lying circumferentially on the mirror 66 while its long dimension is disposed transversely or longitudinally on the mirror. A vertically disposed cylindrical lens 40 forms a vertical image at slit 38 of the image elemental scan area reflected from the mirror. Slit 38 is formed in plate 37. The narrow dimension of the slit 38 lies in the horizontal sweep direction of area N on line P. The mirror 66 bends the optical path. As the mirror rotates the angle of inclination of the sides of the mirror changes and the elemental scan area N sweeps along line P repeatedly. At all points of its sweep the dimensions of the image 58 of the elemental scan aperture at the phototube 50 are defined by the two slit apertures 38 and 53. The sweep direction aperture 38 defines the sweep direction dimension of the elemental scan aperture N. The feed direction aperture 53 defines the copy feed direction dimension of the elemental scan aperture. Although the mirror bends the optical path, the slits are each parallel to the axis of the particular cylinder lens which converges light to it. In this way distortion of the images is kept to a minimum. It is important in this arrangement that the reflected light R should clear the incident light I without requiring an excessive angle of incidence. When the drum 66 is rotated on shaft 32, the scanning spot N moves over scanned line P repetitively between points $P_0$ and $P_2$. Compensation for change in optical path length from the mirror to line P is made by employing a drum having spiral perimeter so that the optical path is always the same length.

It is possible to use each of the systems of Figs. 1 and 12 as a photo-recorder if phototube 50 is replaced by a lamp which emits light modulated in accordance with signals representing graphic copy and applied as electrical pulses to the lamp. If sheet 43 is photosensitive, then as mirror 45 or 66 rotates, the graphic copy will be photographically recorded.

What is claimed is:

1. A device for scanning a record sheet, comprising a warped cylindrical optical element having a light reflecting surface, said surface being twisted to disposed opposite circumferential ends thereof at an acute angle to each other, opposite axial ends of said element having spiral perimeters, a rotatable disk support for said element, a light shield defining a divided light path, a lens having a mask defining a plurality of slits therein, another lens, at least one of the lenses having a cylindrical curvature, a light source, a movable copy sheet and a phototube, said element, lenses, light shield, light source, photocell and copy sheet being disposed in a common reentrant optical path, whereby a single fixed line on said sheet is scanned upon rotation of said element.

2. A device for repeatedly scanning a fixed line on a record sheet, comprising a warped cylindrical optical element having a smoothly curved and twisted light reflecting surface, said surface having a central line defining a circle, all other lines parallel to said central line defining spirals, opposite ends of said surface being disposed at an acute angle to each other, opposite end faces of said elements having spiral perimeters, the curvature of said surface being continuous and free from discontinuities from one end to the other end of the surface, the inclination of the surface to axis of said element varying continuously between the opposite ends of said surface, a rotatable opaque support for said element, said support having a spiral slit therein, means for rotating said element at a constant angular rate, means for continuously advancing said record sheet in one direction past said fixed line, a light source, a lens, an opaque element having a linear slit, and a phototube, said light source, light reflecting surface, lens, fixed line, lens, linear and spiral slits, and phototube being disposed in sequence in an optical path.

3. A device according to claim 2, wherein said support further comprises a transparent element having a spiral light collecting groove disposed adjacent to said spiral slit in said optical path.

4. A scanning device, comprising a flat faced rotatable opaque disk, an annular mirror carried on the periphery of said disk, said mirror being inclined and continuously varying in inclination from end to end thereof with respect to the flat faces of the disk, said faces having spiral perimeters, said disk having a transparent spiral slit therein, a lens, a graphic copy medium, a light source disposed at one end of an optical path including said copy medium, lens and disk in sequence, said mirror reflecting a moving spot of light onto a single line of said copy medium for reflection therefrom, said lens focusing the reflected line onto said disk for repeated scanning by said slit, and light responsive means at the other end of said path for receiving the light reflected from said line.

5. A facsimile scanning device, comprising a flat faced rotatable opaque disk, an annular mirror carried on the periphery of said disk, said mirror having one side inclined to and continuously twisted varying in inclination from end to end thereof with respect to the flat faces of the disk, said faces having spiral perimeters, said disk having a transparent spiral slit therein, a stationary opaque member having a straight slit disposed adjacent to said spiral slit to define a moving aperture therewith during rotation of said disk, a lens, a light reflecting copy medium, a light source disposed at an end of an optical path including said mirror, copy medium, lens and aperture in sequence, said mirror reflecting a moving spot of light on a single line of said copy medium for reflection therefrom, said lens focusing the reflected line on said disk for repeated scanning by said aperture, a photocell disposed at the other end of said optical path, and lens means disposed in said path and focusing the line scanned by said aperture on said photocell, said copy medium being movable in a path transverse to said line so that successive lines on said medium are scanned by said aperture.

6. A facsimile scanning device, comprising a flat faced rotatable opaque disk, an annular mirror carried on the periphery of said disk, said mirror having at least one side inclined and continuously varying in inclination from end to end thereof with respect to the flat faces of the disk, said faces having spiral perimeters, said disk having a transparent spiral slit therein, a stationary opaque member having a straight slit disposed adjacent to said spiral slit to define a moving aperture therewith during rotation of said disk, a lens, a light reflecting copy medium, a light source disposed at an end of an optical path including said mirror, copy medium, lens and aperture in sequence, said mirror reflecting a moving spot of light on a single line of said copy medium for reflection therefrom, said lens focusing the reflected line on said disk for repeated scanning by said aperture, a photocell disposed at the other end of said optical path, and lens means disposed in said path and focusing the line scanned by said aperture on said photocell, said copy medium being movable in a path transverse to said line that successive lines on said medium are scanned by said aperture, said lens means comprising a transparent disk juxtaposed to said opaque disk and having a spiral groove therein in registration with said slit, said groove having a bottom varying continuously in inclination with respect to the plane faces of the opaque disk.

References Cited in the file of this patent

UNITED STATES PATENTS

| | | |
|---|---|---|
| 651,691 | Barr | June 12, 1900 |
| 1,530,463 | Jenkins | Mar. 17, 1925 |
| 1,790,491 | Smith | Jan. 27, 1931 |
| 2,285,593 | Lemert | June 9, 1942 |

FOREIGN PATENTS

| | | |
|---|---|---|
| 1,102,568 | France | Oct. 24, 1955 |